L. G. NE VILLE.
COLLAPSIBLE WHEEL FOR AUTOMOBILES.
APPLICATION FILED NOV. 4, 1919.
1,359,827.
Patented Nov. 23, 1920.
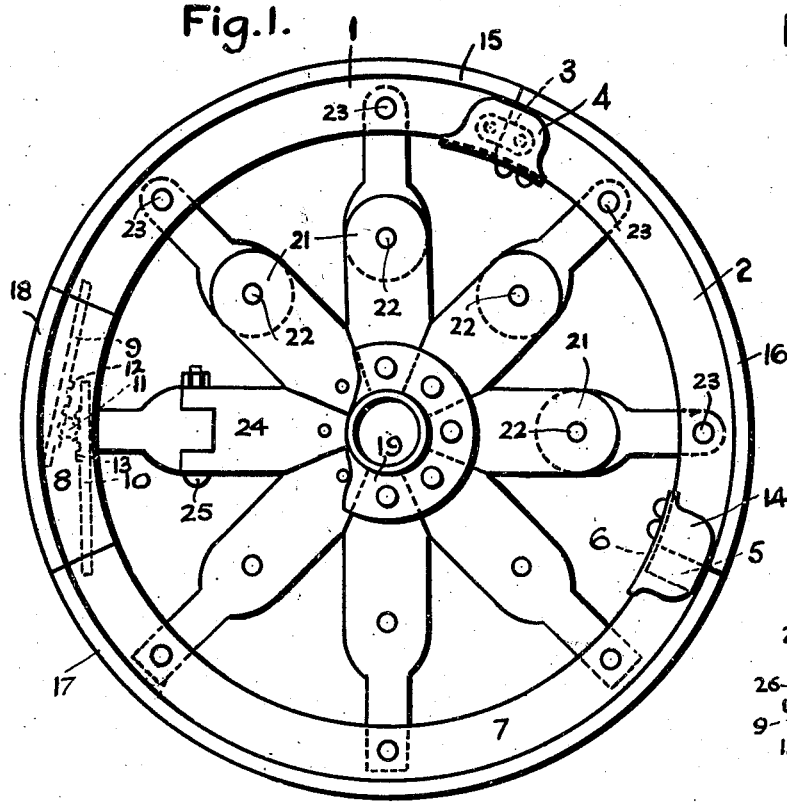
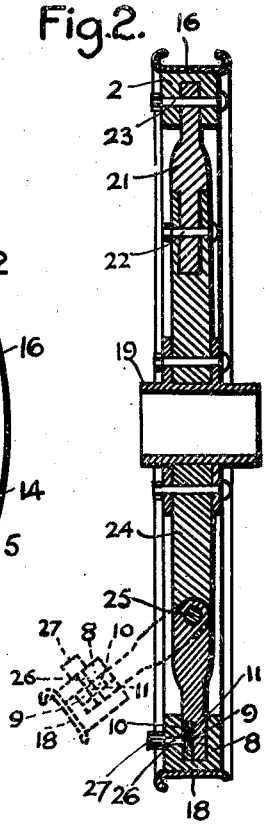
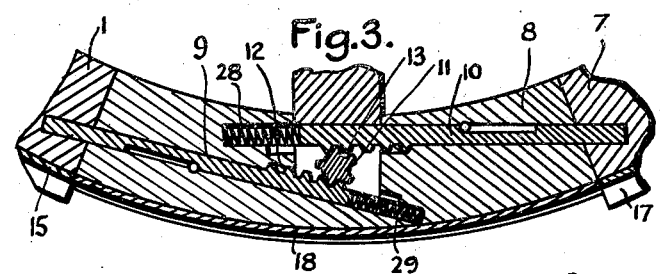
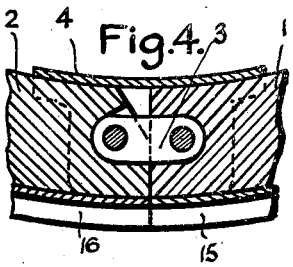
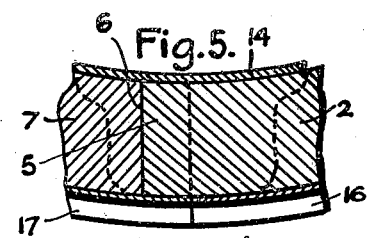
Inventor:
L. G. Ne Ville
BY Featherstonhaugh & Co.
ATTY'S.

UNITED STATES PATENT OFFICE.

LOUIS GEORGE NE VILLE, OF TORONTO, ONTARIO, CANADA.

COLLAPSIBLE WHEEL FOR AUTOMOBILES.

1,359,827.  Specification of Letters Patent.  Patented Nov. 23, 1920.

Application filed November 4, 1919. Serial No. 335,592.

*To all whom it may concern:*

Be it known that I, LOUIS GEORGE NE VILLE, of the city of Toronto, in the county of York, Province of Ontario, Dominion of Canada, have invented certain new and useful Improvements in Collapsible Wheels for Automobiles, of which the following is the specification.

My invention relates to improvements in collapsible wheels for automobiles, and the object of the invention is to devise a collapsible wheel from which the tire can be readily removed, and repaired or replaced as occasion demands. A further object is to construct a collapsible wheel that will not be liable to "rusting up" and thus impair its efficiency.

My invention consists of a felly and tire carrying rim divided into four segments, two adjacent felly segments hinged together, the free end of one of the adjacent felly segments provided with a tongue adapted to fit into a recess in one end of the next felly segment, a fourth felly segment, corresponding rim segments attached to the felly segment, bolts for securing the fourth segment to the adjacent segments, a hub, spokes rigidly securing the segment with a recess in one end to the hub, transversely hinged spokes swingably securing the two adjacent hinged segments to the hub, and a spoke so hinged that while securing the fourth segment to the hub the segment will be permitted to swing out of engagement with the adjacent segments on release of the locking bolts therefrom, all as hereinafter more particularly described, and illustrated in the accompanying drawing, in which:—

Figure 1 represents an elevation of a wheel constructed according to my invention.

Fig. 2 is a cross section thereof taken on the line 2—2, of Fig. 1.

Fig. 3 is an enlarged sectional detail showing the means for locking the fourth felly segment to the adjacent segments.

Fig. 4 is an enlarged sectional detail showing the hinge for connecting two felly segments together, and Fig. 5 is an enlarged sectional detail showing the tongue joint between two of the felly segments.

Like characters of reference indicate corresponding parts in the different views.

1 and 2 are two segments of the felly suitably hinged together by the hinge 3. 4 is a shield covering the joint. The free end of the segment 2 is provided with a tongue 5 adapted to fit into a recess 6 in the felly segment 7. 8 is the fourth segment of the felly provided with the locking bolts 9 and 10 which lock the segment to the adjacent segments 1 and 7. The said bolts are actuated by the pinion 11 engaging the racks 12 and 13 respectively on the faces of the bolts 9 and 10. 14 is a shield covering the tongue joint 5.

The segments 1, 2, 7 and 8 carry respectively the rim segments 15, 16, 17 and 18, the latter rim segment 18 having one bead thereof removed as shown in Figs. 2 and 3.

19 is the hub. 20 are spokes rigidly connecting the hub 19 to the felly segment 7. 21 are spokes hinged intermediately of their length by the bolts 22, the inner ends of the spokes being secured to the hub 19 and their outer ends hinged to the felly segments 1 and 2 by the bolts 23. 24 is a spoke hinged intermediately of its length by the bolt 25, the other end secured to the felly segment 8. The spoke is so hinged that the felly segment 8 can be swung outwardly out of engagement with the felly segments 1 and 7 when desired. 26 is a spindle on the pinion 11, extending through the segment 8 and provided with the head 27. 28 and 29 are springs at the end of the bolts 10 and 9 respectively for assisting in locking the bolts.

The wheel is actuated as follows:—

Assuming the rim to be carrying a tire. By unlocking the bolts 9 and 10 by turning the pinion 11, the felly segment 8 and the corresponding rim segment 18 can be swung outwardly out of engagement with the adjacent felly segments 1 and 7, and the rim segments 15 and 17. The felly segment 2 can then be disengaged from the felly segment 7 and the two felly segments 1 and 2 carrying the rim segments 15 and 16 can be swung inwardly and the tire readily removed. The bead on one side of the rim segment 18 is removed in order that the segment will clear the inner bead of the tire when such segment is swung outwardly.

When the wheel is assembled and a tire thereon it will be rigid, and although the felly and rim are divided into segments, it will achieve the same result as if the felly and rim were formed integrally.

Although I have described my wheel as provided with four felly and rim segments it will be readily understood that it could be constructed of any suitable number of segments.

What I claim as my invention is:

1. In a collapsible wheel for automobiles, a plurality of felly segments, corresponding rim segments attached thereto and means for throwing one felly segment and its corresponding rim segment out of the plane of the remaining felly rim segments for collapsing the wheel.

2. In a collapsible wheel for automobiles, a plurality of felly segments, corresponding rim segments attached thereto, means for throwing one felly segment and its corresponding rim segment out of the plane of the remaining felly rim segments for collapsing the wheel and means within the felly for normally securing the felly segments together constituting a rigid felly and rim.

3. In a collapsible wheel for automobiles, a plurality of felly segments, corresponding rim segments attached thereto, a hub, spokes rigidly securing one felly segment to the hub, spokes hinged intermediately of their length secured to the hub, and hinged at their outer ends to all the remaining felly segments except one, and a spoke hinged intermediately of its length secured to the hub and one felly segment for permitting the swinging of that segment out of the plane of the remaining felly segments.

4. In a collapsible wheel for automobiles, a plurality of felly segments, corresponding rim segments attached thereto, two of the felly segments hinged together, the free end of one of the hinged felly segments provided with a tongue, one felly segment provided with a recess in one end for receiving the tongue, a hub, spokes rigidly securing the felly segment having the recess in one end to the hub, spokes hinged intermediately of their length secured at their inner ends to the hub, and hinged at their outer ends to the hinged felly segment, a felly segment having locking means therein for connecting the same to one of the hinged segments and to the felly segment having a recess in one end, and a spoke hinged intermediately of its length secured to the hub and felly segment having the locking means, and permitting the swinging of that felly segment out of the plane of the adjacent felly segments.

LOUIS GEORGE NE VILLE.

Witnesses:
GERTRUDE NICHOLSON,
J. W. Y. MITCHELL.